US007043280B1

(12) United States Patent
Shields et al.

(10) Patent No.: US 7,043,280 B1

(45) Date of Patent: May 9, 2006

(54) MECHANICALLY ROTATABLE WIRELESS RF DATA TRANSMISSION SUBSCRIBER STATION WITH MULTI-BEAM ANTENNA

(75) Inventors: Richard A. Shields, Kirkland, WA (US); Randy J. Karr, Maple Valley, WA (US); James E. DeMaria, Seattle, WA (US); Carter K. Green, Lynnwood, WA (US); Gregory D. Perrigo, Woodinville, WA (US); Barry S. Cobb, Renton, WA (US); Kent W. Olson, North Bend, WA (US); Mark D. Reudink, Seattle, WA (US)

(73) Assignee: Adaptix, Inc., Seattle, WA (US)

(*) Notice: Subject to any disclaimer, the term of this patent is extended or adjusted under 35 U.S.C. 154(b) by 692 days.

(21) Appl. No.: 09/975,732

(22) Filed: Oct. 11, 2001

(51) Int. Cl.
*H04M 1/00* (2006.01)
*H01Q 1/24* (2006.01)

(52) U.S. Cl. .............. 455/575.1; 455/90.3; 455/575.5; 455/575.7; 455/562.1; 343/700 MS; 343/702; 343/841; 343/872

(58) Field of Classification Search ............ 455/575.1, 455/296, 90.3, 575.5, 575.7, 562.1; 343/872, 343/709, 710, 766, 758, 846, 702, 841, 700 MS
See application file for complete search history.

(56) References Cited

U.S. PATENT DOCUMENTS 3,984,837 A * 10/1976 Tatnall ........................ 343/705
4,594,472 A * 6/1986 Brettle et al. .......... 174/35 GC
4,920,350 A * 4/1990 McGuire et al. ............ 343/709
5,311,397 A * 5/1994 Harshberger et al. ....... 361/683
5,359,337 A * 10/1994 Eguchi ....................... 343/765
5,550,553 A * 8/1996 Yamaki et al. .............. 343/785
5,596,814 A * 1/1997 Zingle et al. ................. 34/296
5,691,736 A * 11/1997 Hunn et al. ................. 343/872
5,828,339 A * 10/1998 Patel .................. 343/700 MS
5,892,481 A * 4/1999 Andersson .......... 343/700 MS
6,064,344 A * 5/2000 Walton ....................... 343/704
6,072,994 A * 6/2000 Phillips et al. ................ 455/84
6,091,375 A * 7/2000 Goto et al. ................. 343/872
6,195,060 B1 * 2/2001 Spano et al. ................ 343/766
6,232,680 B1 * 5/2001 Bae et al. ...................... 310/17
6,259,933 B1 * 7/2001 Bambridge et al. ......... 455/557
6,480,522 B1 * 11/2002 Hoole et al. ................ 375/130
6,538,611 B1 * 3/2003 Noro .......................... 343/725

* cited by examiner

*Primary Examiner*—Sonny Trinh
*Assistant Examiner*—Huy Phan
(74) *Attorney, Agent, or Firm*—Fulbright & Jaworski LLP

(57) ABSTRACT

A wireless RF data transmission system subscriber station has a fixed, overhead bracket secured, spindle. An open sided housing is rotatably mounted to the spindle. The housing has a finned heat sink and is interiorly coated with heat absorbing paint. Emissions shielding enclosures secured within the housing house an RF transceiver. An antenna array mounted to an enclosure is operatively connected to the transceiver through the enclosures for communicating RF data signals. An A/D-D/A board is mounted to an enclosure on an opposite side from the array. A radome is secured over a face of the array, sealed to the housing by a carbon impregnated gasket. An electric motor mounted within the housing and operatively engaging the spindle is controlled by antenna aiming logic for aiming the station and its array. An orifice sealed with a waterproof, breathable membrane allows moisture to escape the housing and prevents moisture infiltration.

40 Claims, 4 Drawing Sheets

MECHANICALLY ROTATABLE WIRELESS RF DATA TRANSMISSION SUBSCRIBER STATION WITH MULTI-BEAM ANTENNA

FIELD OF THE INVENTION

The present invention generally relates to wireless RF data communication. Specifically, the present invention relates to a mechanically rotatable multi-beam subscriber station transceiver and antenna.

BACKGROUND OF THE INVENTION

Prior art microwave and data communications subscriber equipment in point to point or point to multipoint RF data transmission systems has typically been housed in separate enclosures. Generally, a prior art wireless RF data transmission subscriber station would consist of an antenna comprising one outdoor enclosure. A radio and RF to IF converters would be in at least one other enclosure, which might be outdoors. An indoor unit for a third enclosure maybe include IF to RF converts as well as analog to digital (A/D) and digital to analog (D/A) converters. A fourth unit would be a power supply to power the other units.

Interconnecting cables between such units disposed in separate enclosures is problematic. The prior art teaches making these connections using coax or waveguides. Both of these connection media suffer from a common problem, moisture ingress. Moisture is very lossy at microwave frequencies.

Another problem associated with the use of multiple enclosure units is the fairly complex level of technical skill necessary to install the separate units. The components are generally intended to be located in physically diverse locations both indoors and out. The time invested and/or the hourly rate of a technician necessary to properly install such a prior art configuration is considerable. To install prior art configurations with separate enclosures a number of specialized tools, some mechanical and some electronic, including test consoles to make sure that the service is properly enabled, are necessary. Generally, during prior art installations, an installer aligns or peaks the directional antenna toward a base station. With prior art physically separate components additional costs may be associated with locating one or more antennas on the roof of a building.

Additionally, prior art fixed data subscriber antennas fail to provide flexibility to change base stations as interference and line of sight changes dictate. This also further limits the placement of a data subscriber antenna as a fixed antenna would always require a clear line of sight to the base station to which it is linked. This may dictate that a prior art fixed data subscriber antenna be placed in a location outside of the users space such as the aforementioned rooftop. Further, the use of multiple enclosures as discussed above may render a prior art data subscriber station too bulky or impractical for installation in a user's space.

Typically prior art fixed point to point or point to multipoint data transmission systems have used fixed antennas. Oftentimes roof top mounted antennas as discussed above are necessary to avoid signal blockages. Where movable antennas have been employed, such as in radar, the technology suffers from disadvantages. A stationary radome typically is disposed around and encapsulates an antenna array that may rotate on a spindle. Hence, a prior art subscriber station might typically have a very large, stationary radome that defines a hard enclosure covering the entire volume that a moveable antenna rotates within. With a stationary radome, a requirement for convection air flow adjacent to cooling features of the enclosure associated with hot radio and signal processing electronics forces separation of the antenna from these electronics, resulting in two sub-enclosures. Though these two sub-enclosures may reside together on a common structure defining the overall device, the sub-enclosures have disparate and incompatible functions, one being to protect the moving antenna from weather and the other to dissipate heat. This packaging results in a much larger overall device that must be mounted on stand-offs or otherwise disposed away from a mounting surface in order to maintain convective airflow, thus making the overall device effectively still larger when installed. The bulkiness of this packaging generally forces separation of the electronics and the radome entirely. Therefore, the hot electronics associated with the radio and signal processing equipment of a prior art subscriber station might be separated from a prior art moveable antenna array so that heat generated by the electronics can be effectively dissipated and not trapped by the radome.

BRIEF SUMMARY OF THE INVENTION

The present invention is directed to a wireless RF data transmission subscriber station with integrated multibeam antenna. The subscriber station is preferably an indoor or outdoor mounted data transceiver with integral antenna array, RF and IF electronics, digital signal processing electronics and power supply. Preferably, the present subscriber station is mechanically, rotatable and employs a multibeam antenna array. There are no external connections between the antenna array and the RF electronics. An integral or integrated approach to the antenna and the radio is employed. The present invention reduces the number of enclosures for an RF data subscriber station to make the subscriber station more compact and lower cost. Also, a more modular design eases user installation of such a subscriber unit. The present subscriber station helps reduce the costs of installation by providing an integrated unit that is installed in the end user's space, rather than on top of a building. Furthermore, this would facilitate rapid implementation of the system. Additionally, the present invention can be easily deployed to provide wireless RF data communication due at least in part to elimination of coax or waveguide connections from the antenna to the radio.

Preferably, the subscriber station is axially rotatable from its overhead mounting bracket. A preferred embodiment of the unit can rotate 360 degrees, but preferably has a travel limiter that prevent it from spinning continuously. In other words, the unit can preferably physically steer 180 degrees either left or right from front-center before being stopped by the travel limiter. The preferred mounting bracket is a structural element with an axial attachment for the subscriber station. The bracket can be mounted to a wall, ceiling, overhang or other surface. Preferably, a separate integral transformer/connector block having an AC transformer and an Ethernet local area network (LAN) interface output/input provides a power/signal interface from a subscriber equipment LAN interface to the subscriber station.

To address the problems existent with prior art wireless data customer equipment configurations. The subscriber station integrates previously separated indoor and outdoor components into a single integrated compact unit. Previous radio products of this capacity have utilized at least three enclosures for mechanical packaging: one outdoors for RF components, another outdoors for the antenna, and one indoor enclosure for digital circuitry and LAN connections.

The present subscriber station combines the antenna and associated RF electronics into one enclosure system by highly integrating the electronics and employing heat management and weatherization mechanisms.

The preferred subscriber station incorporates details and designs optimizing it for either outdoor or indoor installation. A separate mounting bracket system used for the subscriber station preferably employs features to address either an indoor or outdoor environment. The preferred housing and its preferred mounting bracket embody compactness and design ergonomics suitable for an indoor consumer environment. The preferred subscriber station is fully weatherized for outdoor operation. For example, it manages temperature extremes, solar heat rise, wind, humidity, and vibration conditions. The indoor LAN/transformer unit provides a transformer block, a LAN connection and signal/power line connection to the subscriber station. The present system eliminates any need for customer equipment-chassis mounted components beyond a LAN interface card or the like.

The subscriber station has the cost advantages of being built as a single unit in one enclosure, on one factory line. End user installation of the subscriber station is straightforward. The present device has many features to simplify its installation by the end user employing little technical skill and without the need for special tools or testing equipment. Logic embedded in the unit handles antenna aiming and registration on the data network.

Undesirable, internal and external electromagnetic interference (EMI) with the subscriber station's ability to receive a desired frequency is preferably managed by a combination of specialized features. For example, in an embodiment of the present subscriber station, these features preferably include use of an aluminum or magnesium rear housing, EMI shielding enclosures for the transmission electronics, and carbon-impregnated gaskets. The EMI shielding enclosures also effectively provide an EMI barrier between the unit's own digital electronics and the active side of the antenna array.

The subscriber station preferably has internal pressure equalization and condensation prevention. Preferably, the subscriber station is not airtight, but is resistant to humidity and ingress of insects and environmental debris. In one embodiment, through the use of an air permeable, waterproof diaphragm material covering a through-hole, pressure inside the unit is equalized with external atmospheric pressure, regardless of temperature, maintaining performance. In addition, as the housing cools and internal pressure drops, moisture from outside air does not enter this embodiment of the unit, although pressure is easily equalized.

The shielding enclosures also preferably provide a pathway for dissipation of heat generated by the transmitter and receiver boards. Preferably, paint applied to the subscriber station rear aluminum or magnesium housing enhances heat extraction. By applying heat absorbent paint to the interior of the subscriber station housing, heat transfer to the aluminum or magnesium housing from internal electronic components and the shielding enclosures is preferably enhanced. Within the subscriber station, hot electronic components are preferably located in close physical proximity to the aluminum or magnesium housing for heat transfer out of the unit.

Packaging of antenna and active electronics in a single moveable unit reduces the size of the subscriber station and maintains heat extraction. By packaging the antenna and active electronics tightly together in one axially moveable subscriber station, the total size of the subscriber station is reduced significantly with no loss in performance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
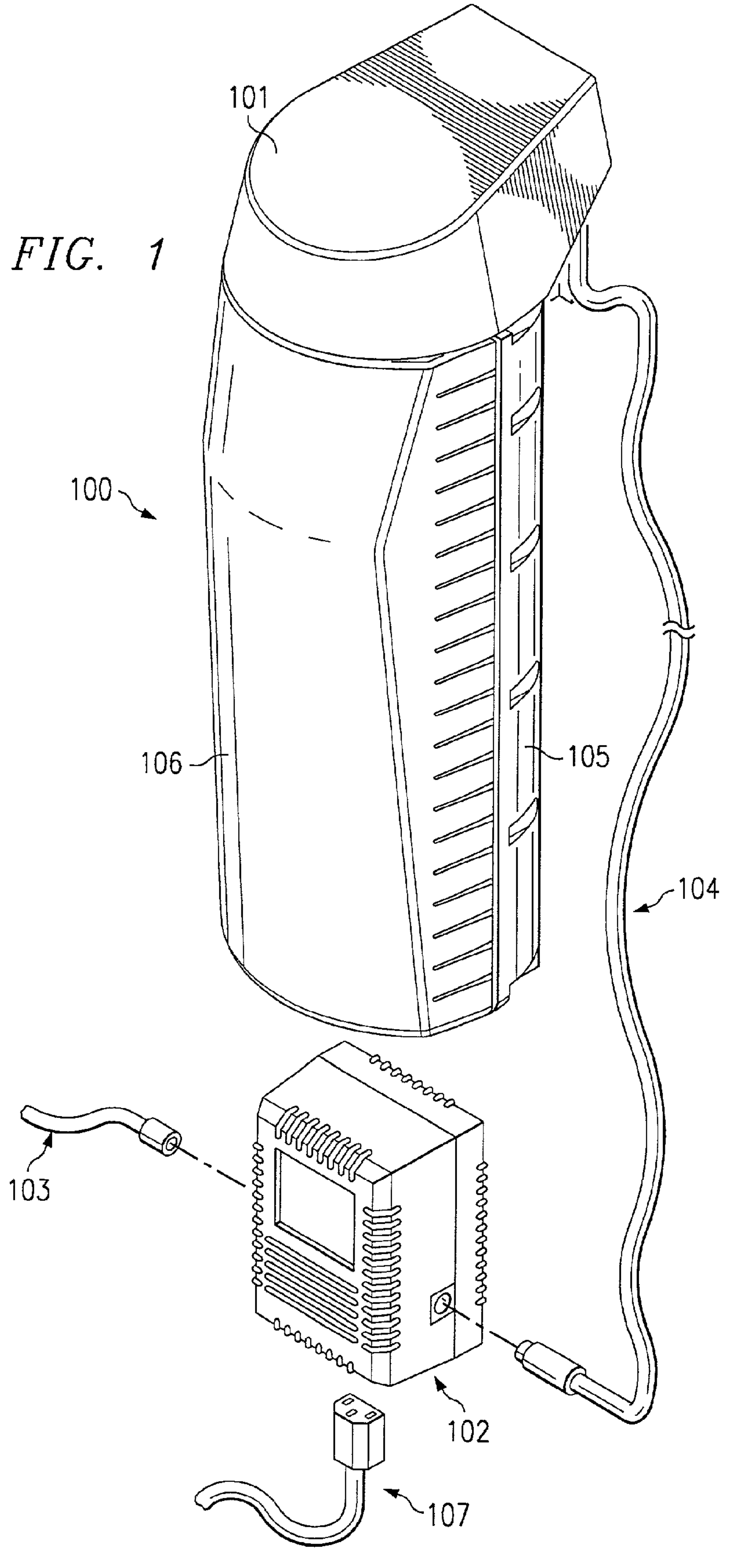
FIG. 1 is a partially fragmented environmental perspective view of the preferred subscriber station operably suspended from a mounting bracket and deployed in conjunction with a transformer/LAN block.

Turning to FIG. 1, subscriber station 100 is a rotatable integrated RF/electronics unit and multi-beam antenna array, shown suspended from a preferred overhead mounting bracket 101. Separate transformer/LAN block 102 may provide Ethernet connection 103 to subscriber equipment and a combined power/LAN signal connection to subscriber station 100 via line or cable 104. Subscriber station 100 has mechanical functions and is weatherized, facilitating its use indoors or out.

Figure 2:
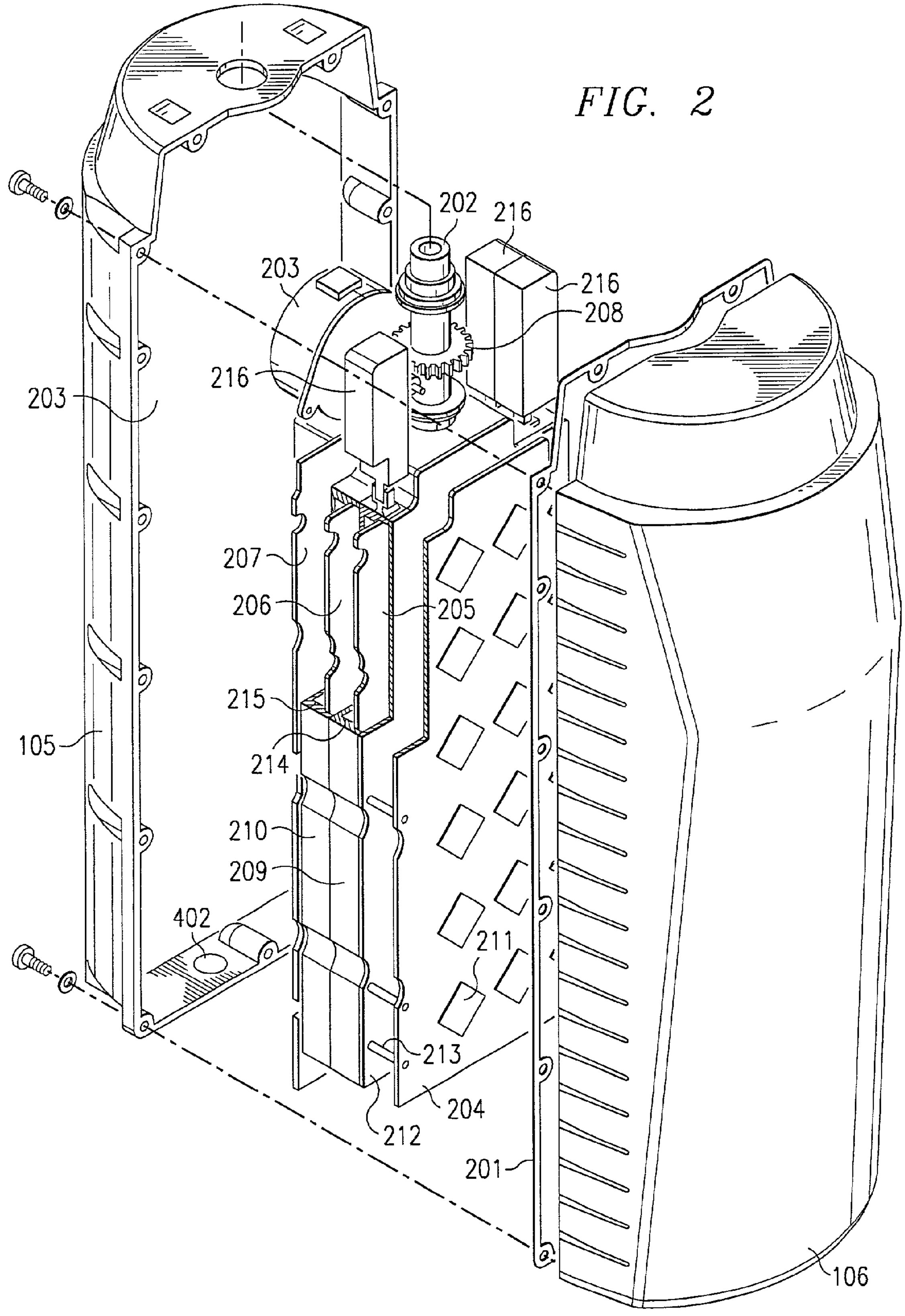
FIG. 2 is an exploded view of the subscriber station of FIG. 1.
Figure 3:
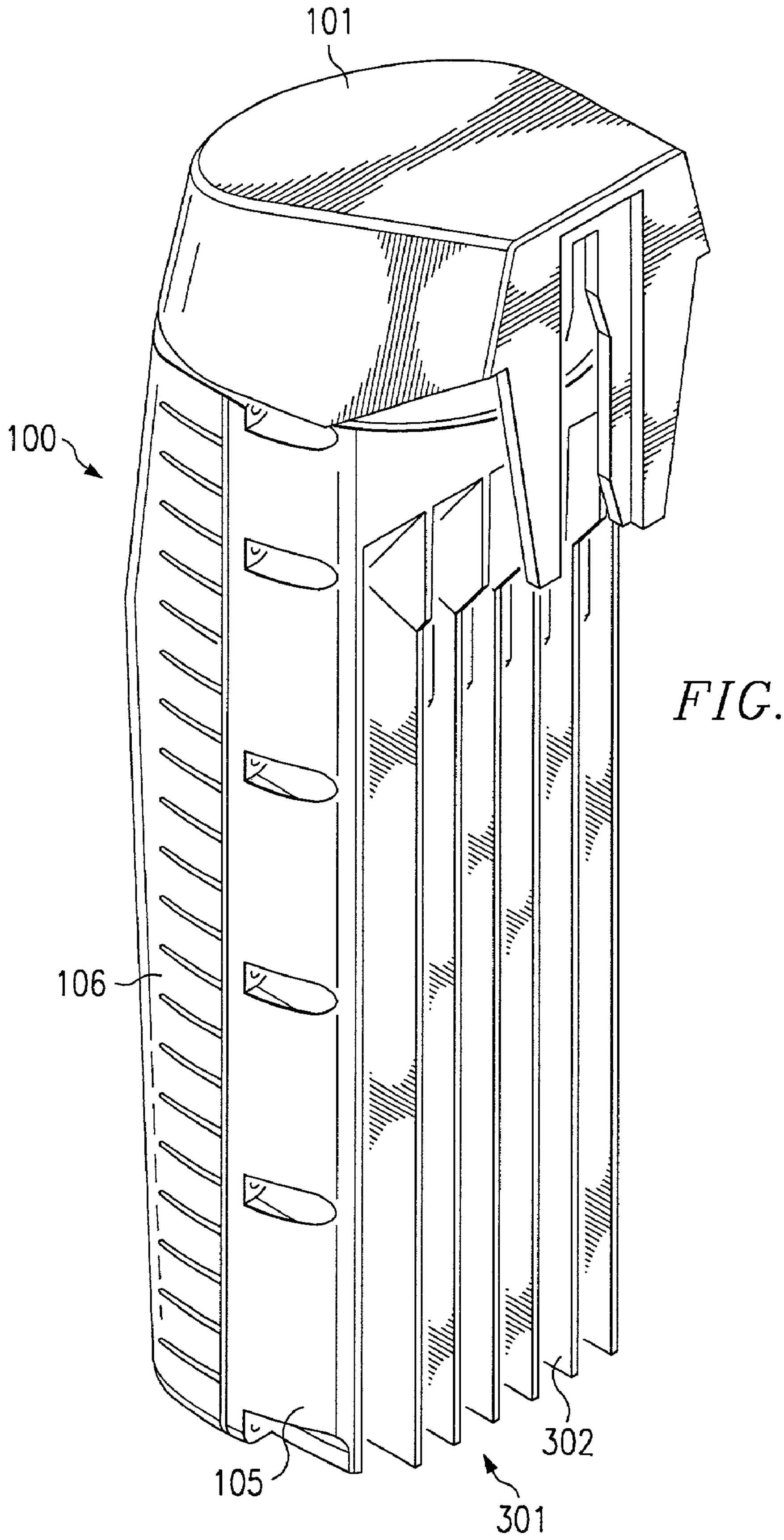
FIG. 3 is a rear perspective view of the subscriber station of FIG. 1 suspended from a mounting bracket.

Turning to FIGS. 2 and 3, the exterior of subscriber station 100 preferably comprises die cast rear housing 105 and resilient injection molded radome 106. Preferably, housing 105 is cast from aluminum or magnesium and also provides heavily finned heat sink 301 for heat dissipation via fins 302. Preferred embodiments of housing 105 and radome 106 have a robust closure detail preferably including weather-proof carbon impregnated gasket 201 captured between rear housing 105 and radome 106 at the interface sealing surfaces. A spindle 202 extends upward from RF/electronics subscriber station 100. The unit preferably rotates on spindle 202 using low torque stepper motor 203 and gear reduction 208. Onboard software logic preferably drives subscriber station 100 axially.

Figure 4:
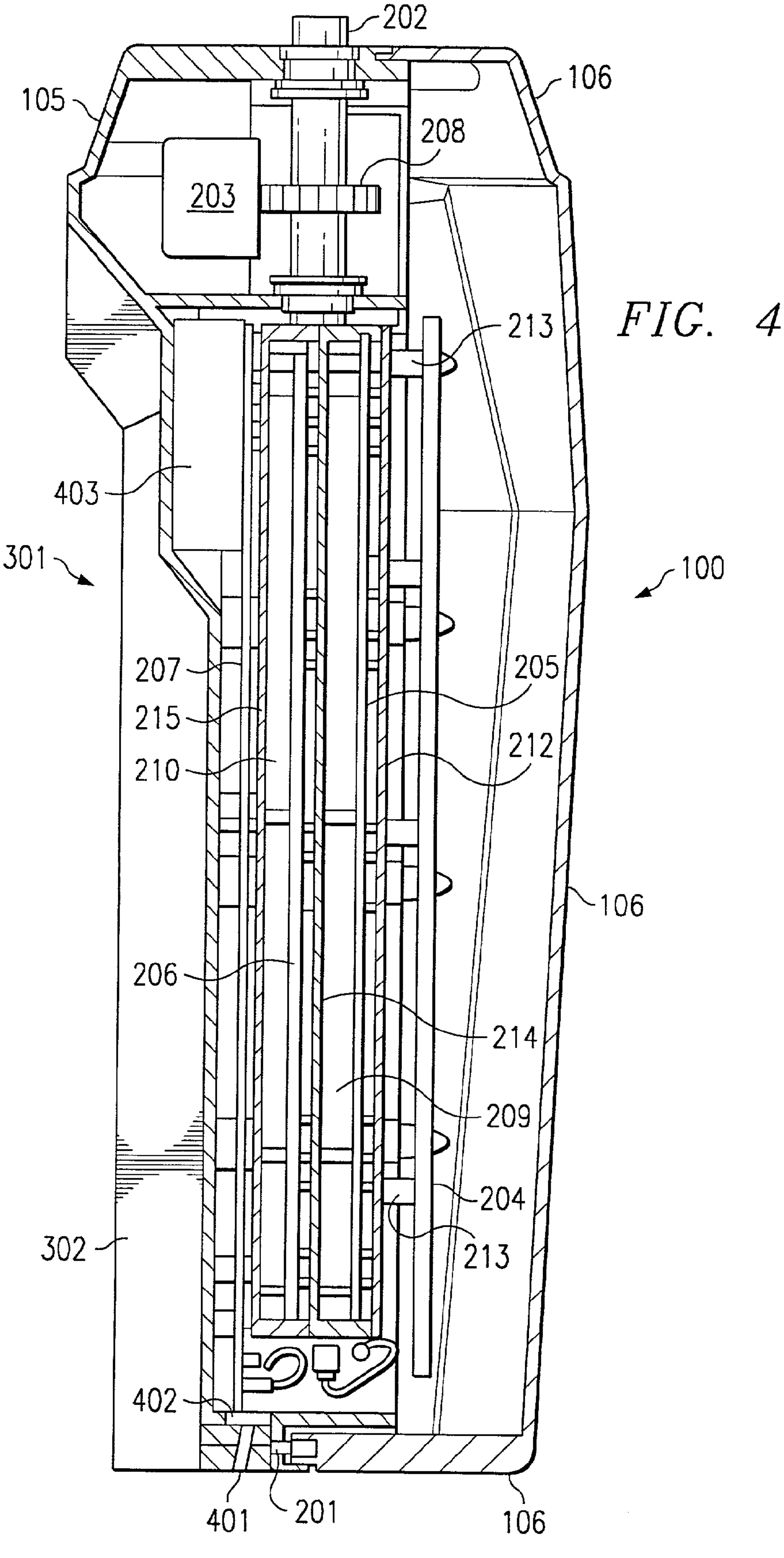
FIG. 4 is a fragmented side view of the subscriber station of FIG. 1.

As shown in FIGS. 2 and 4, subscriber station 100 preferably houses a plurality of printed circuit assemblies (PCAs), such as antenna board 204, receiver board 205, transmitter board 206 and digital signal board 207. Antenna array 204, may use a Butler matrix feed network or other similar multibeam forming apparatus. Receiver board 205 and transmitter board 206 preferably make up a transceiver which allows simultaneous and/or duplexed transmission and reception. The transceiver preferably employs low noise amplifiers, to make the unit as sensitive as possible for reception of low power data signals. The transceiver also preferably employs voltage control oscillators for multiple frequency tuning. A substantial amount of filtering both in digital chips, known as finite impulse response (FIR) filtering, and also discrete filtering such as surface acoustical wave (SAW) filtering is preferably carried out by RF filters 216.

Preferably, extensive use is made of analog to digital (A/D) converters and digital to analog (D/A) converters by digital signal board 207. Preferably, incoming signals are converted from an analog RF signal to a digital signal for use by the subscriber. For transmitting, signals originate from subscriber equipment as a digital Ethernet signal or the like and are converted to an RF signal for transmission. The signal is imposed on a carrier signal, preferably produced by a voltage controlled oscillator. Preferably, both digital FIR filtering and mechanical SAW filtering are carried out on the signal. Then the signal is passed through a power amplifier set, which directly drives antenna output. The PCAs 204, 205 and 207 each preferably have their own shielding and heat management mechanisms carried out in conjunction with the internal configuration of housing 105. As will be appreciated by those skilled in the art functionality of various components of the preset system may be integrated into fewer, or even a single, board or the like. For example, transmitter board 206 and receiver board 207 could be combined into a transceiver board, which might also include all or part of the functionality of digital board 207.

Preferably, antenna array 204 is protected by radome 106, which is preferably UV resistant for outdoor installation. Subscriber station 100 eliminates the need for a larger radome by having preferred local modular radome 106 disposed only on the front of subscriber station 100. The back of antenna array 204 is preferably shielded to prevent extraneous signals from entering transceiver circuitry 205 and 206 and to keep out-of-band signals, interfering signals or other noise from being received by array 204 from the rear. This shielding is provided by shielding enclosures 209 and 210 encapsulating receiver board 205 and transmitter board 206, respectively. These enclosures or cans 209 and 210, being disposed between digital board 207 and antenna array 204, also act as shielding between digital board 207 and antenna array 204. Furthermore, these shielding enclosures 209 and 210 aid in keeping electronic noise from escaping subscriber station 100 ensuring compliance with spectrum regulations. Carbon impregnated gasket 201 also aids in blocking introduction of external RF interference and EMI from entering subscriber station 100 and in encapsulating emissions of subscriber station 100 via the interface of radome 106 and housing 105.

The front most element within subscriber station 100 is antenna array board 204. It has active elements 211 disposed on its face to communicate with a base station. Array 204 is preferably mounted to an exterior surface lid 212 of receiver shielding enclosure 209 using standoffs 213, or the like. Lid 212 fits to enclosure 209 sealing enclosure 209 with receiver board 205 within. Receiver enclosure 209 in turn seals transmitter board 206 within transmitter shielding enclosure 210. Back wall 214 of receiver enclosure 209 preferably acts as a front wall for transmitter enclosure 210. Preferably, digital board 207 may be mounted to rear wall 215 of transmitter board enclosure 210. Preferably, the shielding provided by enclosures 209 and 210 prevents spurious radiation originating from behind subscriber station 100 from distorting the antenna's performance. Shielding enclosures 209 and 210 encapsulate internal emissions from transmitter and receiver boards 206 and 205 while shielding emissions from digital signal board 207 to prevent leakage around antenna 204 and degrading of the signals received or transmitted by elements 211 on the front of antenna board 204.

Subscriber station 100 is adapted to allow the subscriber, the end user of a wireless RF data service, to readily install subscriber station 100 without the aid of a technician. The use of special tools and equipment is eliminated. Mounting bracket 101 is secured in place and spindle 202 is mated with bracket 101 and secured, preferably using a threaded fastener such as an allen bolt or the like. Preferably, Ethernet LAN connector cable 103 is the only connection required to customer equipment. LAN cable 103 is connected to a LAN port associated with a customer's computer, network hub or the like. Power cord 107 preferably provides AC power from an electrical outlet to transformer/LAN block 102, which in turn provides DC power to subscriber station 100 via power/signal cord 104. Subscriber station 100 does not require an installer to peak, align or adjust the antenna because the unit does so automatically on startup, following installation.

Upon installation, embedded logic in the subscriber station preferably starts motor 203, rotates subscriber station 100 to perform an RF environmental survey in 360 degrees with antenna array 204 to locate an optimal base station, and initializes service. Subscriber station 100 preferably locates and tabulates base station signals available. Information about the direction of available base stations is stored in internal or subscriber equipment memory. If the subscriber station loses the signal from its primary base station, this stored information makes reregistration of a different base station more efficient, because the subscriber station has a listing of directional locations of other base stations. Logic control for subscriber station 100 aims antenna array 204 for the best bit error rate, or digital eye pattern rather than for the strongest signal. Aiming for the least amount of errors initially mitigates possible interference present in the operational environment. If there is interference present, it is preferable that multibeam antenna array 204 place the interference in a null pattern, or between side lobes of the generated antenna beams at the expense of using a somewhat weaker signal. Therefore, a main antenna beam lobe may not be aimed at a base station, but rather elsewhere so as to place an interferer in a null pattern and thereby decrease the bit error rate. Use of a multibeam antenna array facilitates such use of non-line-of-sight reception and rapid azimuth changes for reception and transmission beams.

Subscriber station 100 can withstand both hot temperatures, including the effects of the sun or solar heat rise, and cold conditions. While subscriber station 100 is weatherized to protect the components from the effects of precipitation, the unit is allowed to breathe. As best seen in FIG. 4, breathing hole 401 in the bottom of subscriber station 100 is preferably internally covered with waterproof, breathable membrane 402 made from a material such as GORTEX®. GORTEX® patch 402 allows pressure to equalize by allowing air to pass out of subscriber station 100 while stopping moisture infiltration. Preferably, this also allows any inadvertently captured moisture to escape subscriber station 100.

The interior of RF/electronics subscriber station 100 provides an avenue to dissipate heat produced by the components within to the outside. Hot components 403, such as employed in the aforementioned digital signal electronics, are preferably maintained in contact with rear heat sink 301 defined by housing 105, so that there is direct metal contact between hot components, such as a power supply, power amplifiers or IC chips, and the heat sink. Preferably, enclosures 209 and 210 may provide a path for heat dissipation from transmitter board 206 and receiver board 207 into housing 105, where it may be dissipated to the outside. Preferably, black or dark paint on the interior of housing 105 absorbs heat out of the air within the unit facilitating heat dissipation via heat dissipation fins 302 of heat sink 301.

Antenna array 204 is housed in close proximity to rotation spindle 202. By also packaging the hot electronics as close to spindle 202 as possible and in contact with heat sink 301 on the back of subscriber station 100, the overall unit is significantly reduced in size and can fit much closer than prior art units to a mounting surface such as a wall. By placing the heat producing circuitry in housing 105 out from under radome 106, the heat is not trapped by radome 106 and thereby more easily dissipated. Radome 106 is localized around antenna array 204, so it does not trap heat from heat sink 301. Additionally, by mounting RF/electronics subscriber station 100 from overhead bracket 101, heat is more easily radiated, as a space can be maintained between a mounting wall and heat sink 301, allowing convection cooling. Heat rising from subscriber station 100 preferably warms bracket 101 preventing ice build up at the bracket and subscriber station interface. Preferably overhead bracket 101 has a slightly larger diameter than the subscriber station disposed beneath, allowing bracket 101 to act as a weatherhead, protecting the subscriber stations from precipitation.

Preferably, an embodiment of subscriber station 100 is approximately 5.2 inches wide and deep, with a height of approximately 12.375 inches, separate of the rotating spindle extending out the top of the unit into mounting bracket 101. Preferably, bracket 101 for this embodiment is approximately 5.3 inches wide. To provide mounting surface clearance, and convention air flow behind subscriber station 100, mounting bracket 101 is preferably about 5.4 inches deep. The bracket is preferably approximately 2.5 inches in height.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A subscriber station for a wireless RF data transmission system, said subscriber station comprising:

a spindle extending upwardly from said subscriber station;

a housing rotatably mounted to said spindle, said housing having an open side and comprising a heat sink;

at least one emissions shielding enclosure secured within said housing;

an RF communications board mounted in said at least one enclosure;

an antenna array mounted to a first side of said at least one enclosure, said array operatively connected to said communications board through said at least one shielding enclosure for communicating RF data signals; and a radome secured over a face of said antenna array, sealed to said housing.

2. The subscriber station of claim 1 wherein said RF communications board comprises an RF receiver mounted in said at least one enclosure.

3. The subscriber station of claim 1 wherein said RF communications board comprises an RF transmitter mounted in said at least one enclosure.

4. The subscriber station of claim 1 wherein said RF communications board comprises an RF transmitter mounted in one of said at least one enclosures and an RF receiver mounted in another of said at least one enclosures.

5. The subscriber station of claim 1 further comprising:

means for controllably rotating said station on said spindle.

6. The subscriber station of claim 5 wherein said rotating means comprises an electric motor mounted within said housing and operatively engaging said spindle.

7. The subscriber station of claim 5 further comprising:

means for aiming said antenna array by controlling said rotating means.

8. The subscriber station of claim 7 wherein said aiming means is disposed within said housing.

9. The subscriber station of claim 1 further comprising:

an analog to digital converter operatively connected to said RF communications board; and a digital to analog converter operatively connected to said RF communications board.

10. The subscriber station of claim 9 wherein said analog to digital and said digital to analog converters are mounted on an opposite side of said at least one enclosure from said antenna array mounted on said first side of said at least one enclosure.

11. The subscriber station of claim 1 further comprising:

filtering circuits associated with said communications board.

12. The subscriber station of claim 11 wherein said filtering circuits comprise at least one surface acoustical wave filter.

13. The subscriber station of claim 11 wherein said filtering circuits comprise at least one finite impulse response filter.

14. The subscriber station of claim 1 wherein at least one emission shielding enclosure dissipates heat from said RF communications board.

15. The subscriber station of claim 1 wherein said heat sink comprises heat dissipation fins defined by a back wall of said housing.

16. The subscriber station of claim 1 further comprising:

a gasket captured between sealing surfaces of said housing and said radome, sealing said radome and said housing as a unitary enclosure.

17. The subscriber station of claim 15 wherein said gasket is carbon impregnated to block RF and electromagnetic interference from entering and exiting said subscriber station.

18. The subscriber station of claim 1 further comprising:
a breathing orifice sealed with a waterproof, breathable membrane allowing moisture to escape said housing and preventing moisture infiltration through said orifice into said housing.

19. The subscriber station of claim 1 wherein an interior of said housing is coated with heat absorbing paint facilitating dissipation of heat from within said housing.

20. The subscriber station of claim 1 wherein said spindle is secured to a fixed overhead bracket.

21. The subscriber station of claim 20 wherein said subscriber station is generally cylindrical and said overhead bracket covers a top of said subscriber station acting as a weatherhead.

22. The subscriber station of claim 1 wherein said subscriber station is suspended adjacent to a vertical surface, spaced apart from said surface, allowing convective heat flow around said station to dissipate heat from said heat sink.

23. A subscriber station for a wireless RF data transmission system, said subscriber station comprising:
a fixed, overhead secured spindle;
a housing controllably rotatably mounted to said spindle, said housing having an open side and comprising a heat sink;
a plurality of emission shielding enclosures secured within said housing;
an RF receiver mounted in a first of said enclosures;
an RF transmitter mounted in a second of said enclosures;
an antenna array mounted to a first side of one of said enclosures, said array operatively connected to said RF receiver and said RF transmitter through said enclosures to communicate RF data signals on at least one of a plurality of antenna beams produced by said array;
an analog to digital and digital to analog converter mounted to an opposite side of said enclosures from said array;
a radome secured over a face of said antenna array, sealed to said housing; and
means for rotating said subscriber station and aiming said array.

24. The subscriber station of claim 23 wherein said rotating means comprises an electric motor mounted within said housing operatively engaging said spindle, and logic for aiming said array.

25. The subscriber station of claim 24 wherein said aiming logic is dispose.

26. The subscriber station of claim 23 wherein said enclosures further comprise means for dissipating heat produced by said RF receiver and said RF transmitter.

27. The subscriber station of claim 23 wherein each of said enclosures comprise an enclosure body sealed by an enclosure lid.

28. The subscriber station of claim 27 wherein said array is mounted to a lid of one of said enclosures.

29. The subscriber station of claim 27 wherein said lid of at least one of said enclosures is comprised of at least a portion of said body of another one of said enclosures.

30. The subscriber station of claim 23 further comprising:
filtering circuits associated with said transmitter and said receiver.

31. The subscriber station of claim 30 wherein said filtering circuits comprise at least one surface acoustical wave filter.

32. The subscriber station of claim 30 wherein said filtering circuits comprise at least one finite impulse response filter.

33. The subscriber station of claim 23 wherein said heat sink comprises heat dissipation fins defined by a back wall of said housing.

34. The subscriber station of claim 23 further comprising:
a gasket captured between sealing surfaces of said housing and said radome sealing said radome and said housing as a unitary enclosure.

35. The subscriber station of claim 34 wherein said gasket is carbon impregnated to block RF and electromagnetic interference from entering and exiting said subscriber station.

36. The subscriber station of claim 23 further comprising:
a breathing orifice sealed with a waterproof, breathable membrane allowing moisture to escape said housing and preventing moisture infiltration through said orifice into said housing.

37. The subscriber station of claim 23 wherein an interior of said housing is coated with heat absorbing paint facilitating dissipation of heat from within said housing.

38. The subscriber station of claim 23 wherein said spindle is secured to a fixed overhead bracket.

39. The subscriber station of claim 38 wherein said subscriber station is generally cylindrical and said overhead bracket covers a top of said subscriber station acting as a weatherhead.

40. The subscriber station of claim 23 wherein said subscriber station is suspended adjacent to a vertical surface, spaced apart from said surface allowing convective heat flow around said station to dissipate heat from said heat sink.

* * * * *